UNITED STATES PATENT OFFICE.

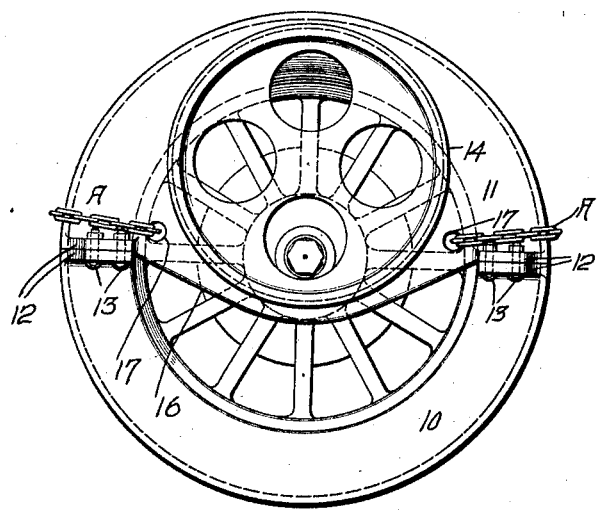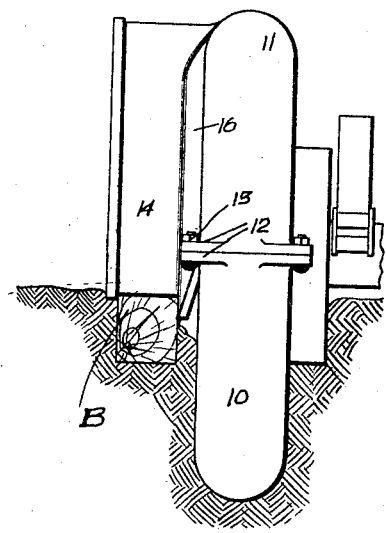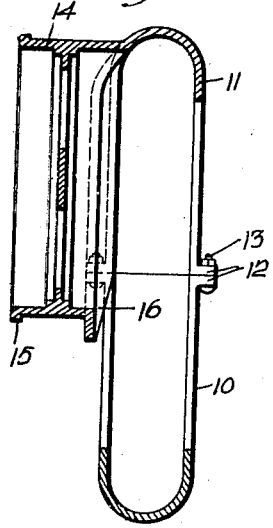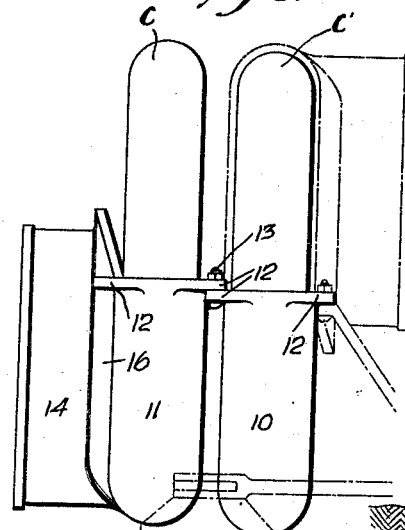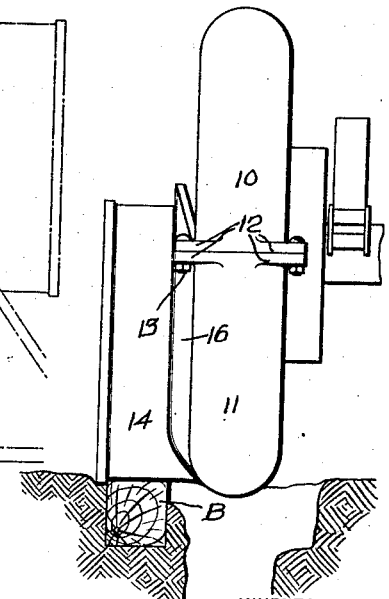

FAUSTINO B. URBANO, OF NEW YORK, N. Y.

ROTARY JACK FOR VEHICLES.

1,394,376.  Specification of Letters Patent.  Patented Oct. 18, 1921.

Application filed November 17, 1920. Serial No. 424,663.

*To all whom it may concern:*

Be it known that I, FAUSTINO B. URBANO, a citizen of the Philippines, and a resident of the city of New York, borough of Manhattan, in the county and State of New York, have invented a new and Improved Rotary Jack for Vehicles, of which the following is a description.

My invention relates more particularly to a rotary jack for use in connection with an automobile or other vehicle where a wheel has sunk in a mud hole, sand, or rut, and more particularly the invention relates to a rotary jack employing an eccentrically mounted jack element.

The general object of my invention is to provide a rotary jack especially useful on an automobile and adapted to be applied to the wheel over the tire casing to constitute an applied tread for the wheel and having an eccentrically disposed auxiliary tread to act as a jack, whereby the device in addition to its usefulness as a jack may function as an ordinary tread when applied over the casing of a deflated tire that the automobile may be run with the deflated tire without damaging the same.

The invention furthermore has for an object to provide a jack of the indicated type so formed as to constitute a holder for two spare tires or a holder completely inclosing a single spare tire.

Reference is to be had to the accompanying drawings forming a part of this specification, it being understood that the drawings are merely illustrative of one example of the invention.

Figure 1 is a front elevation of a rotary jack embodying my invention;

Fig. 2 is an edge view thereof showing the jack in position for causing the wheel to rise from a hole in the road;

Fig. 3 is a view similar to Fig. 2 and showing the device after having been given a half turn and having thus raised the wheel from the hole;

Fig. 4 is a transverse vertical section of my improved jack;

Fig. 5 is an end view showing the manner of using the jack as arranged for holding a spare tire or tires.

In carrying out my invention in accordance with the illustrated example, I provide a round jack body formed in two approximately half sections, 10, 11, having means to separably unite said sections, there being shown flanges 12 on the respective sections fastened by bolts 13.

The sectional body thus formed is U-shaped in cross section at its periphery, as will be clear from Fig. 4, adapted to fit over a tire.

On one of the sections as 11 and rigid therewith is an eccentric 14 presenting externally a tread surface, there being advantageously in practice an annular peripheral bead or rib 15 at the outer edge of said eccentric. Preferably, the eccentric 14 is formed integrally with the section 11 being united to the same by a web 16.

To apply the jack to a wheel and employ it for raising the wheel from a depression in the road, the sections 10, 11 are separated by removing the bolts 13. The one section 10 is placed on top of the wheel over the tread thereof and the wheel given a half turn to dispose the section 10 at the under side of the wheel. The other section 11 with the eccentric 14 is now applied to the wheel over the top of the tire and bolted to the section 10. In order to prevent the jack from creeping about the tire, I provide for the use of tie chains A, ropes, or the like, for which purpose the web 16 is formed with transverse holes 17 through which the chains may be passed about the inner side of the wheel felly and over the periphery of the section 10.

With the jack thus applied to the wheel and with the eccentric 14 disposed at the top of the wheel, an elongated block B or other expedient that may form a track on which the jack may run is placed on the ground in the plane of the eccentric. The wheel is now caused to revolve, and the jack being constrained to partake of the turning movement of the wheels, will engage the block B, thereby lifting the wheel from the road depression and at the same time causing a forward travel.

The jack as described, may be employed on a wheel having a deflated tire so that the periphery of the bolted body sections 10 and 11 will present a tread surface extending about the tire and housing the latter so that the automobile may thus be run on a flat tire without danger of damaging the tire.

A further important use of the invention is that of holding a spare tire or tires. In full lines in Fig. 5 the device is shown with the sections 10, 11 alongside each other and parallel, the open sides being uppermost so that two tires C. C' may rest in said sections, or, as shown, in dotted lines, the section 11 with the eccentric may be positioned on top of the lower section 10 as when used for a jack so that a single spare tire (C') may be housed within the bolted body section. Thus, the jack in being carried will occupy only the space employed for a spare tire carrier.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. A rotary jack comprising a body adapted to be applied to a wheel over the tire thereof to present an annular tread surface about the tire casing; together with an eccentric mounted on said body at a side thereof and presenting an annular auxiliary tread surface.

2. A rotary jack adapted to be applied to a wheel over the tire thereof and presenting externally a tread surface to be disposed in the plane of the wheel when the jack is applied, as well as presenting an eccentric tread surface at a side of the main tread surface.

3. A rotary jack adapted to be applied to a wheel over the tire, and an eccentric jack portion at a side of the body, said body being formed in separable sections, one of which carries the eccentric jack portion.

4. A rotary jack of the class described comprising a sectional body adapted to be applied to a wheel over the tire thereof, and an integral eccentric on one of the sections at a side thereof and integral therewith, said eccentric presenting an annular auxiliary tread surface.

5. A rotary jack of the class described comprising a sectional body adapted to be applied to a wheel over the tire thereof, and an eccentric integral with one of the sections through the medium of a connecting web, said web presenting transverse openings through which a tying medium may be passed.

FAUSTINO B. URBANO.